3,180,893
PREPARATION OF CYCLIC HYDROXY
KETONES
Robert Robinson, Great Missenden, Bucks, and Gordon Ian Fray, Sandhurst, Camberley, Surrey, England, assignors to Shell Oil Company, New York, N.Y., a corporation of Delaware
No Drawing. Filed Nov. 24, 1961, Ser. No. 154,899
Claims priority, application Great Britain, Nov. 28, 1960, 40,808/60
5 Claims. (Cl. 260—586)

This invention relates to a method of producing cyclic diketones. More particularly, the present invention relates to a process for preparing cyclic $\alpha,\beta$-diketones which exist in mono-enol forms.

It is an object of the present invention to provide a novel ring-closure process for the production of cyclic ketones. It is a further object of the present invention to provide a proces for the production of cyclic diketones by a simple, one-step synthesis.

These and other objects may be accomplished by a condensation of a dihydroxy aldehyde and a ketone in the presence of an alkaline catalyst to form a cyclic diketone.

The reaction by which the cyclic diketones of the present invention are prepared may be represented by the equation:

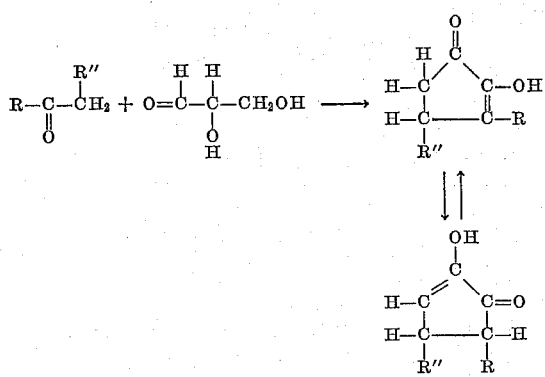

wherein R and R'' are hydrogen or hydrocarbon groups of from 1 to 10 carbon atoms and each may be an alkyl group such as methyl, ethyl, propyl, butyl, i-amyl, hexyl, and in general any alkyl group of up to 20 carbon atoms. In addition to these hydrocarbon groups R and R'' may each also be an aryl group such as phenyl, tolyl, xylyl, and cumyl; an aralkyl group such as benzyl and phenylethyl, or a cycloaliphatic group such as cyclohexyl, cyclopentyl, etc.

The only functional requirement of the ketone reactant employed in the process of the present invention is that the

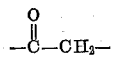

group be present. Thus, ketones such as ethyl isoamyl ketone, phenyl methyl ketone, diethyl ketone, phenylethyl methyl ketone, ethyl propyl ketone, methyl ethyl ketone, and acetone are eminently suitable ketone reactants for the process of the present invention. Ketones which contain other reactive substituents in the molecule, for example, keto acids such as pyruvic acid and acetoacetic acid as well as the esters of alpha-, beta-, gamma-, and epsilon-keto acids may also be used in the reaction according to the present invention. Such esters may be obtained by the reaction of alkylzinc halides with the acyl halide from the half ester of a dibasic acid according to the equation:

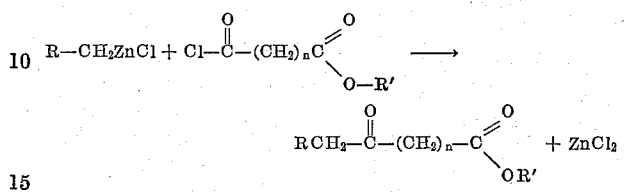

wherein $n$ is an interger from 0 to 6, R or R' may be hydrogn atom or an alkyl, aryl, alkaryl, aralkyl or cyclomatic radical with from 1 to 12 carbon atoms. When R or R' is an alkyl radical such as methyl, ethyl, propyl, butyl, amyl or hexyl, alkyl radicals of from 1 to 6 carbon atoms are preferred. Suitable cyclomatic radicals include cyclohexyl, cyclopentyl, and cycloheptyl radicals. The presence of other reactive substituents in the molecule may result in side reactions of these reactive substituents with the dihydroxy aldehyde reactant used in the present process. However, when these side reactions are completed, the basic reaction of the present invention proceeds according to the preceding equations which only require the presence of the

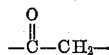

group and a dihydroxy aldehyde. Because of these side reactions, it is preferred to employ ketones of the structure:

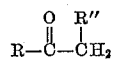

wherein R and R'' may be hydrogen or are hydrocarbon radicals which are selected from the group consisting of alkyl, aryl, aralkyl, alkaryl, cycloalkenyl and cycloalkyl radicals of from 1 to 12 carbon atoms (preferably from 1 to 7 carbon atoms).

The dihydroxy aldehyde reactant of the present invention is preferably glyceraldehyde, but the process may be used with compounds which may be easily converted to glyceraldehyde in situ. Thus, glycidaldehyde and glucose may be used in place of glyceraldehyde itself since both compounds yield glyceraldehyde as a product in the presence of a base (alkali metal hydroxide, for example).

The novel reaction by which the cyclic hydroxy ketones of the present invention are prepared is believed to proceed by way of the following concerted mechanism which involves an initial aldol condensation followed by a series of (keto-enol shifts) and a dehydration step. The steps in the reaction of the present invention may be visualized by the following sequence of equations:

(1) CONDENSATION

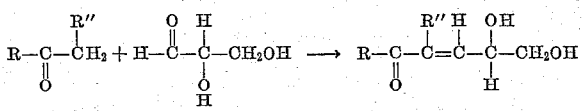

(2) 1,5-ENOLIZATION

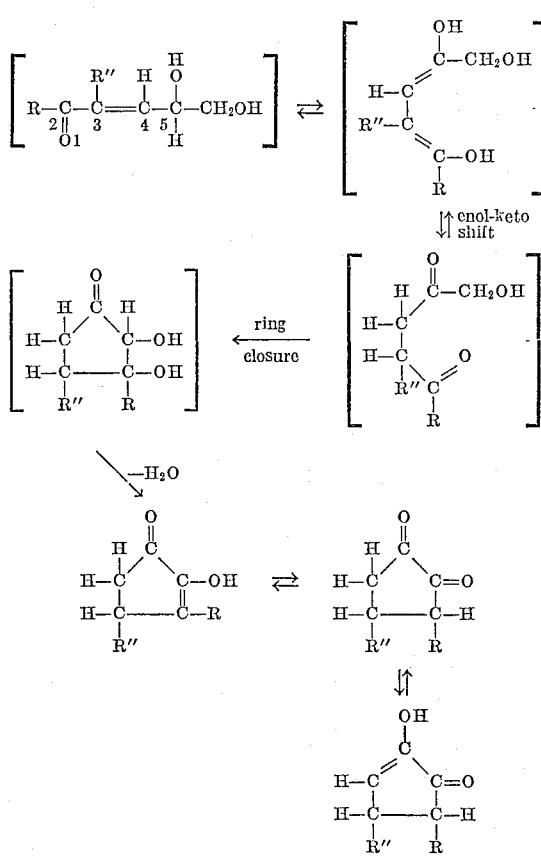

In the above sequence of reactions, R and R" may each represent an alkyl group such as methyl, ethyl, propyl, butyl, i-amyl, hexyl, heptyl, octyl, nonyl, decyl, undecyl and dodecyl or an aryl group such as phenyl, tolyl, xylyl, naphthyl and cumyl. R and R" may be an aralkyl group such as benzyl or phenylethyl as well as a cycloaliphatic group such as cyclopentyl, cyclyohexyl or cycloheptyl radicals. When any member of the group consisting of R and R" is a hydrocarbon radical, each may contain from 1 to 20 carbon atoms and preferably from 1 to 12 carbon atoms. When R and R" is an alkyl radical, the lower alkyl radicals with from 1 to 5 carbon atoms give a particularly suitable subclass of ketones for use in the process of the present invention. In addition to the above hydrocarbon groups, R" may be a hydrogen atom.

Any catalyst which is a source of a hydroxyl anion (usually with a metallic cation) may be used in the process of the present invention. Catalysts which give basic solutions are very suitable. Conventional sources include the alkali metal oxides and hydroxides as well as the alkaline earth metal hydroxides and oxides. Typical catalysts which may be used are compounds such as NaOH, KOH, LiOH, $Ca(OH)_2$, $NH_4OH$, $Na_2CO_3$, $K_2O$, $Na_2O$, CaO, $CaCO_3$, $K_2CO_3$, $KHCO_3$, $Ca(HCO_3)_2$, $Na_2HPO_4$, and $NaHPO_4$. Mixtures of these compounds may also be used. Other salts which generate hydroxyl ions when treated with water will readily occur to those skilled in the art. Both sodium hydroxide and potassium hydroxide have been found to be especially suitable alkali metal compounds which may be used as catalysts in the process of the present invention. When the catalyst employed is an alkali metal oxide or hydroxide, it is preferred to use the catalyst in water solution or in another hydroxylic solvent.

The reaction may be carried out in any suitable inert reaction medium. Water is a preferred reaction medium and when the reaction is carried out in the presence of water the amount of water used may vary from about 20% to about 200% by weight based on the total weight of the reactants, i.e., the aldehyde and ketone.

The quantities of aldehyde and ketone may vary from a mole ratio of aldehyde to ketone of 1:1 to a mole ratio of 1:10, for example, a ratio of 1:5 is suitable. The amount of catalyst may vary from 5% to 35% based upon the weight of the aldehyde reactant. It is preferred to keep the amount of catalyst used between about 20% to about 25% by weight based upon the weight of the aldehyde.

The reaction is conducted at temperatures from 25° C. to 150° C., preferably from 80° C.–120° C. The reaction temperature may be conveniently maintained by refluxing the reaction mixture containing the catalyst in an inert solvent. The solvent may be selected so that the reaction temperature is confined within the proper temperature range when the reaction is conducted under reflux conditions. If the aldehyde reactant is obtained in situ (for example, from glycidaldehyde), it may be necessary to provide external cooling means until the formation of the aldehyde reactant is completed.

The cyclic diketones of the present invention may be separated from the reaction mixture by any conventional method, for example, by vacuum distillation or ordinary extraction with suitable solvents. Thus, for example, the reaction mixture can be saturated with an inorganic salt (sodium chloride) and the unwanted by-product extracted with a suitable solvent such as ether. The aqueous layer obtained may then be acidified with a mineral acid such as hydrochloric acid and the desired cyclic diketone products extracted with light petroleum or ether.

The following examples are submitted for the purpose of further illustrating the process of the present invention but are not to be construed as limiting the invention in any respect. The relationship between parts by weight and parts by volume as expressed in the examples is the same as the relationship between the gram and the cubic centimeter.

*Example I*

Five parts by weight of glycidaldehyde dissolved in 10 parts by volume of acetone was added to a stirred mixture of 25 parts by volume of acetone, 1 part by weight of sodium hydroxide and 25 parts by volume of water. After the vigorous exothermic reaction had abated, the resulting dark solution was refluxed for one hour. The solution was then saturated with sodium chloride and extracted with ether to remove diacetone-alcohol. The aqueous layer was then acidified with hydrochloric acid and again extracted with ether. On evaporation of the dried ethereal solution a dark oil was obtained. This was extracted with several portions of boiling light petroleum (B.P. 40° to 60° C.). On cooling the combined extract deposited needles having an M.P. of 97° to 99° C.

Further purification of the product by sublimation at 90° to 100°/20 mm., followed by recrystallization from ether-light petroleum (B.P. 40° to 60° C.) gave prisms having a melting point of 105° to 106° C. This material was identified by melting point and infrared spectra comparisons as 3-methylcyclopent-2-en-2-ol-1-one (or 5-methylcyclopent-2-en-2-ol-1-one).

*Example II*

The procedure of Example I was repeated using the same quantities of reactants, but using 1.4 parts by weight of potassium hydroxide instead of sodium hydroxide. As in Example I a satisfactory yield of 3-methylcyclopent-2-en-2-ol-1-one (or 5-methylcyclopent-2-en-2-ol-1-one) was obtained.

*Example III*

In this example, the procedure of Example I was repeated but using glyceraldehyde instead of glycidaldehyde. Five parts by weight of glyceraldehyde dimer, 35 parts by volume of acetone, 1 part by weight of sodium hydroxide and 40 parts by volume of water were refluxed for 5 hours.

A satisfactory yield of the crude product, M.P. 100–102° C. was obtained. On recrystallization the same methyl cyclopentenolone as in Example I (M.P. 105–106° C.) was obtained.

*Example IV*

The procedure of Example III was repeated using glycidaldehyde instead of glyceraldehyde, with the same quantities of reactants, and reaction conditions. As before, 3- (or 5-) methylcyclopent-2-en-2-ol-1-one was obtained, the crude product having an M.P. 98° to 100° C.

*Example V*

Seven and five-tenths parts by weight of glucose, 2.0 parts by weight of sodium hydroxide, 45 parts by volume of water and 35 parts by volume of acetone were refluxed for 2.5 hours. Using the procedure of Example I, a satisfactory yield of crude product having an M.P. 80°–84° C. was obtained. On recrystallization 3-methylcyclopent-2-en-2-ol-1-one (or 5-methylcyclopent-2-en-2-ol-1-one) (M.P. 104° to 105° C.) were obtained.

We claim as our invention:

1. A process of producing a cyclopent-2-en-2-ol-1-one by reacting a hydrocarbon monoketone having two hydrogens on a carbon atom alpha to the ketone carbonyl with an aldehyde selected from the group consisting of glyceraldehyde, glycidaldehyde and glucose, in the presence of an alkali metal hydroxide catalyst at a temperature of 25° C. to 150° C.

2. The process of claim 1 wherein the ketone is acetone.

3. A process of producing a cyclopent-2-en-2-ol-1-one by reacting acetone with glyceraldehyde in the presence of an alkali metal hydroxide catalyst at a temperature from 25° C. to 150° C.

4. A process of producing a cyclopent-2-en-2-ol-1-one by reacting acetone with glycidaldehyde in the presence of an alkali metal hydroxide catalyst at a temperature from 25° C. to 150° C.

5. A process of producing a cyclopent-2-en-2-ol-1-one by reacting acetone with glucose in the presence of an alkali metal hydroxide catalyst at a temperature from 25° C. to 150° C.

References Cited by the Examiner

UNITED STATES PATENTS 2,865,962    12/58    Krimen et al. _____ 260—586

LEON ZITVER, *Primary Examiner.*

CHARLES B. PARKER, *Examiner.*